United States Patent [19]

McLarrin

[11] 3,885,639
[45] May 27, 1975

[54] MULTIPROPORTION BEAM SCALES FOR MEASURING EQUAL VOLUMES OF MATERIALS HAVING DIFFERENT SPECIFIC GRAVITIES

[76] Inventor: Robert B. McLarrin, 2495 Hillside Dr., Eureka, Calif. 95501

[22] Filed: Nov. 7, 1974

[21] Appl. No.: 521,669

[52] U.S. Cl.................................. 117/172; 177/251
[51] Int. Cl. ........................ G01g 23/14; G01g 1/18
[58] Field of Search ....... 177/172, 177/246, 177/251

[56] References Cited
UNITED STATES PATENTS

| | | | |
|---|---|---|---|
| 1,793,276 | 2/1931 | Chott............................ | 177/172 X |
| 2,011,649 | 8/1935 | Phillips ............................. | 177/172 |
| 3,547,210 | 12/1970 | Zimmerman.................... | 177/172 X |

*Primary Examiner*—George H. Miller, Jr.
*Attorney, Agent, or Firm*—Naylor, Neal & Uilkema

[57] ABSTRACT

A beam scales for directly measuring a volume of material which is equal to the volume of an object having a specific gravity different from that of the material. The beam is provided at one end with a support for the object and at the other end with a support for the material and the supports are spaced from the fulcrum for the beam by distances inversely proportional to the specific gravity of the material and object, respectively. Adjustment to accommodate for the measurement of materials having different specific gravities is achieved through the provision of an adjustable fulcrum point or the provision of adjustable suspension points for the supports.

9 Claims, 6 Drawing Figures

PATENTED MAY 27 1975   3,885,639

MULTIPROPORTION BEAM SCALES FOR MEASURING EQUAL VOLUMES OF MATERIALS HAVING DIFFERENT SPECIFIC GRAVITIES

BACKGROUND OF THE INVENTION

The present invention relates to the measurement of material by volume and is particularly concerned with a scales whereby a volume of material equal to that of a volume of material of a different specific gravity may be directly measured without guesswork or intermediate calculations. The invention is particularly concerned with such a scales ideally suited for measuring metal for use in the "lost wax" casting method.

In the making of jewelry, dental bridges and other fixtures by the "lost wax" method, an exact pattern is made of the desired object. This pattern is immersed in "investment," similar to plaster of Paris, and the wax pattern is then melted and vaporized out, leaving a mold impression in the investment. The impression is then filled with molten metal or other material by centrifugal force, vacuum pressure, or gravity.

To determine the amount of metal needed for casting in the "lost wax" process, several methods have been used. Some rely on guesswork and this leads to incomplete castings or wasted metal. Others rely upon a displacement process wherein the pattern is immersed in water contained in a beaker, the rise in the water is noted, and metal is then dropped into the beaker until the same rise is obtained. The latter method is both sloppy and inaccurate. Still others rely upon weighing the pattern on a very delicate gram scales and multiplying the result by the specific gravity of the material to be used in the casting. The latter method is generally used where available.

SUMMARY OF THE INVENTION

The present invention employs the "law of the lever" to automatically determine the amount of casting material needed for any wax pattern.

The principal object of the invention is to provide a means whereby the metal for casting an object by the "lost wax" method may be measured directly by balancing the weight of the wax die for the "lost wax" investment against the weight of the metal. This is achieved by providing a balance beam scales wherein: the wax die is supported on one end of the beam; the metal being measured is supported on the other end of the beam; and, the supports for the wax die and the metal being measured are spaced from the fulcrum point for the beam at distances so proportioned that the beam balances when the volume of metal equals the volume of the wax die.

Another object of the invention is to provide such a scales which is simple in construction and, as a result, inexpensive to manufacture.

Still another object of the invention is to provide such a scales with adjustment means to accommodate the measurement of metals of different specific gravities.

BRIEF DESCRIPTION OF THE DRAWING

The foregoing and other objects of the invention will become more apparent when viewed in light of the following detailed description and accompanying drawing wherein.

DESCRIPTION OF THE ILLUSTRATED EMBODIMENTS

Figure 1:
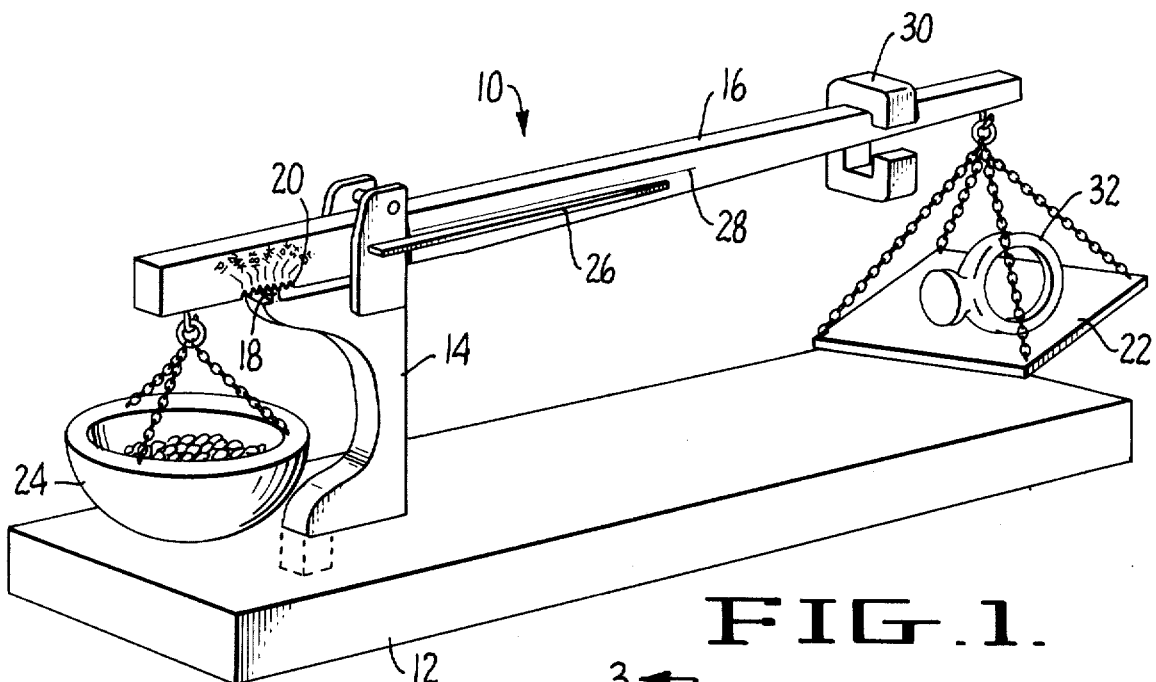
FIG. 1 is a perspective view of a beam scales constructed according to a preferred embodiment of the invention.
Figures 2, 3:
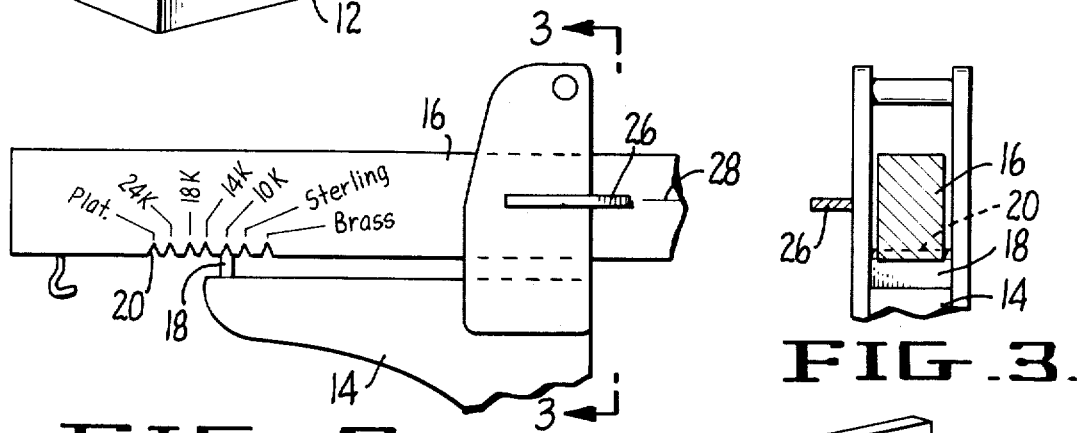
FIG. 2 is an enlarged elevational view, with parts thereof broken away, showing the fulcrum support of the sacles illustrated in FIG. 1.
FIG. 3 is a cross-sectional view taken on the plane designated by line 3—3 in FIG. 1.

Referring now to FIG. 1, the beam scales is designated therein in its entirety by the numeral 10. The basic elements of the scales comprise a base 12, a fulcrum support 14 and a balance beam 16. The fulcrum support is provided with a knife edge 18 which is selectively engageable within any one of a plurality of fulcrum notches provided in the beam, said notches being designated 20. As may be seen from FIG. 2, each notch 20 is provided for a particular metal to be measured.

One end of the balance beam suspends a platform 22 for the support of a die for which the comparative measurement is desired. The other end of the balance beam supports a cup 24 for receipt of the material to be measured. The fulcrum support carries a level pointer 26 and the balance beam is provided with a level indicating line 28. When the pointer 26 and line 28 are aligned, the beam is in a level condition. A counter-balance weight 30 is slidably mounted on the beam for longitudinal movement therealong to provide for leveling of the beam prior to loading of the platform 22 and cup 24.

In operation of the FIG. 1 embodiment, the knife edge 18 is first set for engagement with the notch 20 for the metal being measured. The counter-balance weight 30 is then moved to a position wherein the balance beam 16 is level and then the wax die desired to be duplicated is placed on the platform 22. An exemplary wax die in the form of a ring die 32 is illustrated in FIG. 1. Placement of the die on the platform 22 functions to lower the righthand end of the beam (as viewed in FIG. 1). After the die is placed on the platform 22, the metal desired to be measured is slowly added to the cup 24 until the beam 16 once again balances. Upon reassuming the balanced condition, the volume of metal within the cup 24 exactly equals the volume of the die supported on the platform 22.

Figure 4:
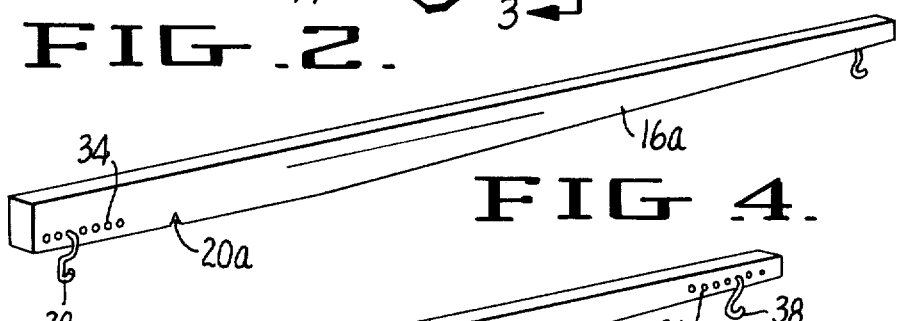
FIG. 4 is a perspective view of a first alternate balance beam which may be used in place of the beam in the scales of FIG. 1.
Figures 5, 6:
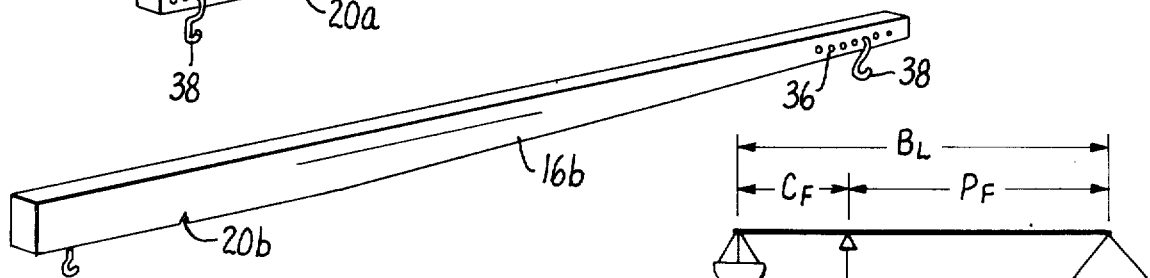
FIG. 5 is a perspective view of a second alternate balance beam which may be used in place of the beam of the scales in FIG. 1.
FIG. 6 is a diagrammatic view of a beam scales constructed according to the present invention, with dimension indicia applied thereto for the beam.

The first and second alternate beams illustrated in FIGS. 4 and 5 are designated by the numerals 16a and 16b, respectively. These beams may be substituted for the beam 16 of FIG. 1 without modification to the remainder of the structure. The beam 16a is provided with a single fulcrum notch 20a and, when employed in the arrangement shown in FIG. 1, this notch rests on the knife edge 18. The beam 16b is provided with a single fulcrum notch 20b and, when this beam is used in the arrangement of FIG. 1, the notch 20b is engaged on the knife edge 18.

Adjustment of the balance beam 16a to accommodate the measurement of metals having different specific gravities is achieved by providing a plurality of suspension points 34 for the cup 24. These alternate suspension points provide an adjustment similar to the adjustment provided by the fulcrum notches 20 in the FIG. 1 embodiment, and each point 34 is positioned to accommodate a different metal. Although not illustrated, it should be understood that the suspension points 34 might be provided with metal indicating indicia similar to those used for the notches 20 (See FIG. 2).

Adjustment of the balance beam 16 to accommodate metals having different specific gravities is achieved by providing a plurality of suspension points 36 for the platform 22. These points are of similar construction to the points 34 and, as illustrated, comprise holes formed in the end of the beam for receipt of a hook 38. Each of the suspension points 36 is provided to accommodate the measurement of a metal having a different specific gravity. The respective points 36 may be provided with metal indicating indicia, similar to those used on the notches 20 in the FIG. 1 embodiment.

The use of the FIGS. 4 and 5 embodiments corresponds substantially to that of the FIG. 1 embodiment. The only difference is that, with the FIGS. 4 and 5 embodiments, adjustment to accommodate a particular metal is effected by selecting the suspension point (34 or 36) provided for that metal. Once this suspension point is chosen, the beam is balanced through means of the counter-balance weight 30, the wax die is placed on the platform 22, and the metal being measured is added to the cup 24 until such time as the beam balances.

METHOD OF COMPUTING BEAM PROPORTIONS

The method, by which the proportions of a beam scales constructed according to the present invention are determined, can best be appreciated from FIG. 6. The indicia shown in that figure designate the following dimensions:

$B_L$ = Beam length between suspension points for the metal cup and wax platform.

$C_F$ = Distance between the metal cup suspension point and the fulcrum point.

$P_F$ = Distance between the wax platform suspension point and the fulcrum point.

Using these dimensions and the letters $SG_W$ to designate the specific gravity of the wax die and the letters $SG_M$ to designate the specific gravity of the metal being measured, the following equation must exist for the beam to balance with the volume of the metal equal to that of the volume of the wax die:

$$SG_W(P_F) = SG_M(C_F)$$

or $$\frac{SG_W}{SG_M} = \frac{C_F}{P_F}$$

Thus, when $SG_W$ equals 1, as is typical for the wax used in the lost wax process, the following equation results:

$$P_F = SG_M(C_F)$$

Using this equation, and knowing the specific gravity of the metal being measured and at least one constant dimension for the beam, the remaining dimensions may be determined as follows:

If $B_L$ is constant:

$$P_F + C_F = B_L$$
$$SG_M(C_F) + C_F = B_L$$
$$SG_M + 1 = \frac{B_L}{C_F}$$
$$C_F = \frac{B_L}{SG_M + 1}$$
$$P_F = SG_M \left( \frac{B_L}{SG_M + 1} \right)$$

If $C_F$ is constant:
$$P_F + C_F = B_L$$
$$SG_M(C_F) + C_F = B_L$$

$$SG_M + 1 = \frac{B_L}{C_F}$$

$$B_L = C_F(SG_M + 1)$$
$$P_F = C_F(SG_M + 1) - C_F$$

If $P_F$ is constant:

$$P_F + C_F = B_L$$
$$P_F + \frac{P_F}{SG_M} = B_L$$
$$1 + \frac{1}{SG_M} = \frac{B_L}{P_F}$$
$$B_L = (1 + \frac{1}{SG_M})(P_F)$$
$$C_F = (1 + \frac{1}{SG_M})(P_F) - P_F$$

EXAMPLE

The present invention may be exemplified when viewed with respect to the metals having known specific gravities, a die wax having a known specific gravity, and the beam having a given length.

The following are typical metals and the specific gravities therefor with which the scale might be used:

| Metal | Specific Gravity |
|---|---|
| Platinum | 21.43 |
| 24-carat Gold | 19.36 |
| 18-carat Gold | 15.5 |
| 14-carat Gold | 13.4 |
| 10-carat Gold | 11.57 |
| Sterling Silver | 10.46 |
| Bronze | 9.00 |

Assuming the wax die has a specific gravity of 1 and taking the length of the beam between the suspension points for the cup and platform ($B_L$) at 6 inches, when measuring 18-carat gold with a specific gravity of 15.5, the dimensions $C_F$ and $P_F$ can be determined as follows:

$$C_F = \frac{6}{15.5 + 1} = .3636$$

$$P = \frac{15.5 \times 6}{16.5} = 5.6364$$

CONCLUSION

From the foregoing detailed description, it is believed apparent that the present invention provides for the attainment of the objects initially set forth herein. It should be understood that the invention is not intended to be limited to the specifics of the embodiments illustrated and described, but rather is defined by the following claims.

What is claimed is:

1. A beam scales for directly measuring a volume for material which is equal to the volume of an object having a specific gravity different from that of the material, said scales comprising: a balance beam; first support means at one end of the beam for supporting the object; second support means at the other end of the beam for supporting the volume of material to be measured; a fulcrum support disposed intermediate the ends of the beam and so positioned relative to the first and second support means that the beam balances when the volume of material supported on the support means equals the volume of an object supported on the first support means.

2. A beam scales, according to claim 1, wherein the first and second support means are spaced from the fulcrum supports by distances inversely proportional to the specific gravity of object and material, respectively.

3. A beam scales, according to claim 1, further comprising adjustment means to provide for relative adjustment of the distances between the support means and the fulcrum support to accommodate the measurement of materials having different specific gravities.

4. A beam scales, according to claim 3, wherein the adjustment means comprises means to selectively move the fulcrum support relative to the first and second support means.

5. A beam scales, according to claim 4, further comprising means to adjust the balance of the beam to accommodate for movement of the fulcrum support.

6. A beam scales, according to claim 5, wherein the fulcrum support comprises a knife edge and the adjustment means comprises a plurality of notches formed in the beam at longitudinally spaced positions relative to one another, each said notch being adapted for selective engagement with the knife edge to support the beam thereon.

7. A beam scales, according to claim 6, further comprising indicia for the notches to indicate the material for the measurement of which each of the notches is provided.

8. A beam scales, according to claim 3, wherein the adjustment means comprises means to selectively move the position of the first support means longitudinally of the beam and relative to the fulcrum support.

9. A beam scales, according to claim 3, wherein the adjustment means comprises means to selectively move the second support means longitudinally of the beam and relative to the fulcrum support.

* * * * *